Patented Oct. 14, 1952

2,614,127

UNITED STATES PATENT OFFICE 2,614,127

MANUFACTURE OF HYDROQUINONE

Jonas Kamlet, New York, N. Y., assignor to The B. F. Goodrich Company, New York, N. Y., a corporation of New York No Drawing. Application September 16, 1950, Serial No. 185,321

4 Claims. (Cl. 260—621)

This invention relates to a process for the manufacture of hydroquinone. More particularly, it relates to an improved process for reducing p-benzoquinone to hydroquinone. It has for its object to provide a simple and inexpensive process whereby p-benzoquinone may be reduced in good yield to hydroquinone of good color and sufficiently high purity to be used as a photographic developer, without further beneficiation, such as sublimation, recrystallization, etc.

Hydroquinone is manufactured industrially by processes involving the reduction of p-benzoquinone with powdered iron (von Bramer and Zabriskie, U. S. Patents 1,880,534 and 1,998,177; Schumacher, U. S. Patent 2,006,324; Emde, U. S. Patent 1,540,738; Kleimenhagen, U. S. Patent 2,129,429; PB Report No. 532; BIOS Final Report No. 1627; BIOS Final Report No. 773; PB Report No. 4115). The product initially resulting from these processes, however, is usually quite dark in color. In order to make the products suitable for use as a photographic developer, as an antioxidant and for other uses where a white product of high purity is required, it is usually necessary to submit the crude hydroquinone obtained to repeated recrystallizations from hot water and/or to sublimation under reduced pressure.

The basis of the present invention is the finding that hydroquinone of good color and high purity may be obtained directly by reducing p-benzoquinone in aqueous solution with finely-divided metallic iron in the presence of a water-soluble salt of sulfurous acid, that is, a water-soluble sulfite or bisulfite. The mechanism of the reaction is believed to be substantially as follows:

When p-benzoquinone is reduced with metallic iron, the by-product obtained with the resultant hydroquinone is ferrous hydroxide:

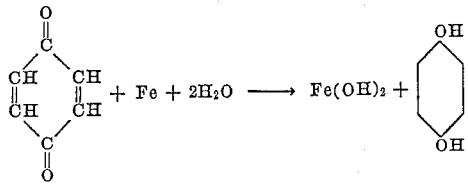

However, ferrous hydroxide is a good reducing agent and a portion thereof may reduce a further quantity of p-benzoquinone and form ferric hydroxide. The ferric hydroxide will form intensely colored hydroxy derivatives of the p-benzoquinone, as well as soluble brown oxidation products of hydroquinone.

By effecting the original reduction of the p-benzoquinone in the presence of a sulfite or a bisulfite, the ferrous hydroxide is continually maintained in the bivalent (ferrous) state and oxidation to the undesired ferric state is prevented. Any ferric hydroxide formed momentarily is at once reduced back to the ferrous state.

The sulfites or bisulfites used in the process of the present invention may be any of those which are water soluble including ammonium, sodium, potassium, ethanolamine, and triethanolamine, sulfites and bisulfites and the like. The concentration of the sulfite or bisulfite in the reduction medium is not critical, and may vary from 0.1% to 5.0%. The bisulfites provide an acidic reaction medium and are definitely preferred.

The precise procedure used in effecting the reduction according to this invention may be varied considerably. The p-benzoquinone used as reactant may be introduced into the reaction medium as vapors or as a moist solid product. When working in the former manner, as is preferred for large scale operations, it has been found particularly advantageous to produce the quinone vapors continuously in the manner described in Gibbs U. S. Patent 2,343,768 (that is, by oxidizing aniline with manganese dioxide and sulfuric acid at a temperature of about 20 to 70° C. while continuously removing the quinone formed by distillation with steam) and then continuously to lead the quinone water vapors into contact with a stream of reducing medium containing hydroquinone mother liquor (a solution of hydroquinone in water), suspended iron powder and dissolved sulfite or bisulfite. A suitable process and apparatus for intermingling quinone vapors with a stream of water containing suspended iron powder is described in detail in U. S. Patent 1,880,534.

On the other hand, a batch procedure similar to that described in U. S. Patent 2,129,429 may be utilized. In this event, the water soluble sulfite or bisulfite is added to the hydroquinone mother liquor before beginning the reduction. The quinone may be added batchwise as vapors or it may conveniently be water-moist p-benzoquinone obtained from the oxidation of aniline with manganese dioxide and sulfuric acid.

Regardless of the procedure utilized it is preferred that the reduction be effected in the substantial absence of atmospheric oxygen, as by working under vacuum or, in the event of a batch process, by bubbling nitrogen through the reaction mixture.

The following example is given more precisely to define and to illustrate the present invention, but in no way to limit it to precise procedure, reagents, proportions or conditions since it is apparent from the foregoing description that numerous modifications and variations may be effected while retaining the advantages resulting from the invention as herein described.

*Example*

The mother liquor of this process is a solution of hydroquinone in water, saturated at 15° C. This is equivalent to a solution containing 58 gms. hydroquinone per liter, and is continually recycled in the process, being recovered as the mother liquor in each reduction. To each liter of this mother liquor is added 2.5% (25 gms.) of sodium bisulfite, in accordance with the finding of the present invention.

One thousand liters of this mother liquor (5.8% hydroquinone and 2.5% $NaHSO_3$) is heated to 75°–85° C. with vigorous agitation, and 10 kgs. of 200 mesh gray cast iron powder is added, while a stream of nitrogen is bubbled through the reaction mixture. About 20 kgs. of water-moist p-benzoquinone (obtained by the oxidation of aniline with manganese dioxide in sulfuric acid solution) is now introduced in small portions into the well agitated reaction mixture.

As soon as the first portion of the p-benzoquinone is reduced, additional portions of iron powder and p-benzoquinone are added alternately in approximately equal weights, until a total of 50 kgs. of p-benzoquinone and 40 kgs. of iron powder have been added. The reduction is carried out at a temperature of 75°–85° C. with vigorous agitation and it is desirable to assure that each portion of p-benzoquinone has been completely reduced to hydroquinone before the next portion of p-benzoquinone is added.

The completion of the reduction can be determined by extracting a test portion of the reaction mixture with ether and evaporating the ether extract on a watch glass. The reduction is complete if the dried extract shows pure white crystals of hydroquinone without the concomitant presence of green quinhydrone crystals.

When the reduction is complete, the reaction mixture is rapidly filtered while hot (with the addition of a little filter aid if desired), and the filtrate is rapidly cooled to 15° C.

The copious precipitate of white hydroquinone thus obtained is filtered off, washed with a little water and dried in a vacuum oven at a temperature not in excess of 40° C. There is thus obtained an almost quantitative yield of 49.8 kgs. of hydroquinone of good color and high purity, melting at 169°–171° C.

The filtrate from the hydroquinone precipitate is the mother liquor of the process, containing 5.8% hydroquinone and 2.5% sodium bisulfite, which is returned for reuse in the next reduction. The slight losses in the sulfite content of the mother liquor may be made up from time to time by the addition of sodium bisulfite or sodium metabisulfite, with the result that the mother liquor may be continuously recycled within the process, being recovered quantitatively after each batch reduction for use in the next batch reduction.

When the above process is carried out in the absence of the sodium bisulfite, the yields of hydroquinone are much lower and the hydroquinone obtained is badly discolored.

Having described my invention, what I claim and desire to protect by Letters Patent is:

1. A process for the reduction of p-benzoquinone to hydroquinone which comprises effecting said reduction with finely-divided metallic iron in an aqueous medium in the presence of a water-soluble salt of sulfurous acid.

2. In the reduction of p-benzoquinone to hydroquinone with metallic iron, the step which comprises effecting said reduction in an aqueous medium in the presence of a water-soluble bisulfite.

3. The process of claim 1 where the aqueous medium contains from 0.1% to 5.0% of a water-soluble bisulfite.

4. The process of claim 1 where the reduction is carried out in the presence of sodium bisulfite.

JONAS KAMLET.

REFERENCES CITED

The following references are of record in the file of this patent:

UNITED STATES PATENTS

| Number | Name | Date |
|---|---|---|
| 2,066,951 | Schumacher | Jan. 5, 1937 |

FOREIGN PATENTS

| Number | Country | Date |
|---|---|---|
| 141,440 | Great Britain | Apr. 19, 1920 |